(12) United States Patent
Tellekamp (10) Patent No.: US 10,573,197 B2
(45) Date of Patent: Feb. 25, 2020

(54) PORTABLE EDUCATION ASSEMBLY

(71) Applicant: Madeleine Tellekamp, Tampa, FL (US)

(72) Inventor: Madeleine Tellekamp, Tampa, FL (US)

(*) Notice: Subject to any disclaimer, the term of this patent is extended or adjusted under 35 U.S.C. 154(b) by 215 days.

(21) Appl. No.: 15/636,027

(22) Filed: Jun. 28, 2017

(65) Prior Publication Data

US 2019/0005840 A1 Jan. 3, 2019

(51) Int. Cl.
*G09B 19/00* (2006.01)
*G09B 19/02* (2006.01)
*G09B 17/00* (2006.01)

(52) U.S. Cl.
CPC .............. *G09B 19/00* (2013.01); *G09B 17/00* (2013.01); *G09B 19/0061* (2013.01); *G09B 19/02* (2013.01)

(58) Field of Classification Search
USPC .......... 434/172, 175, 176, 430; 40/593, 605, 40/617, 618; 446/227
See application file for complete search history.

(56) References Cited

U.S. PATENT DOCUMENTS

| | | | | |
|---|---|---|---|---|
| 412,044 A * | 10/1889 | Scarlett | ................. | G09B 17/00 434/172 |
| 2,767,895 A * | 10/1956 | Smith | ................... | B60R 7/043 224/275 |
| 3,327,419 A * | 6/1967 | Stanos | ................... | A47F 7/143 206/215 |
| 3,571,999 A * | 3/1971 | Downing | ............... | A47F 11/02 160/135 |
| 3,601,917 A * | 8/1971 | Shankman | ............... | G09F 7/12 40/622 |
| 5,125,519 A * | 6/1992 | Cambria | ............. | A45C 7/0086 211/113 |
| 5,195,918 A * | 3/1993 | Mozes | ................... | A63H 33/00 281/15.1 |
| 5,370,060 A * | 12/1994 | Wang | .................... | B60N 3/004 108/149 |
| 5,443,018 A * | 8/1995 | Cromwell | ............. | B60N 3/004 108/44 |
| D398,662 S | 9/1998 | Lane | | |
| 5,878,672 A * | 3/1999 | Ostermann | ........... | B60N 3/004 108/25 |
| 6,113,454 A * | 9/2000 | Mitchell | ............... | A63H 33/00 446/227 |
| 6,169,876 B1 * | 1/2001 | Larson | ................. | G09B 5/062 281/43 |

(Continued)

FOREIGN PATENT DOCUMENTS

WO WO2004091345 10/2004

*Primary Examiner* — Kurt Fernstrom (57) ABSTRACT

A portable education assembly for teaching elementary and middle school curriculum in a vehicle includes a pair of supports. Each of the supports engages a head rest in a vehicle. A plurality of panels is provided and each of the panel is removably coupled to the support. In this way each of the panels is positioned on the back side of the vehicle seat thereby facilitating each of the panels to be visible to a user seated in a back seat in the vehicle. Each of the panels has indicia is printed thereon. The indicia correspond to curriculum in elementary and middle school to assist in teaching the curriculum to the user in the back seat.

4 Claims, 6 Drawing Sheets

(56) References Cited

U.S. PATENT DOCUMENTS

| | | | |
|---|---|---|---|
| 6,183,335 B1 * | 2/2001 | Petersen | A63H 33/00 |
| | | | 446/227 |
| 6,237,267 B1 | 5/2001 | Lackomar | |
| 6,250,526 B1 * | 6/2001 | Bess | B60R 7/043 |
| | | | 224/275 |
| 6,517,407 B1 | 2/2003 | Peters | |
| 6,679,188 B1 * | 1/2004 | Spagnoli, Jr. | B60N 3/004 |
| | | | 108/152 |
| 6,968,960 B1 | 11/2005 | Maliniak | |
| 7,658,153 B1 * | 2/2010 | Patoka | B60R 11/00 |
| | | | 108/152 |
| D654,424 S | 2/2012 | Vadala | |
| 2010/0015882 A1 | 1/2010 | Givens | |

* cited by examiner

PORTABLE EDUCATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to education devices and more particularly pertains to a new education device for teaching elementary curriculum in a vehicle.

BRIEF SUMMARY OF THE INVENTION

An embodiment of the disclosure meets the needs presented above by generally comprising a pair of supports. Each of the supports engages a head rest in a vehicle. A plurality of panels is provided and each of the panel is removably coupled to the support. In this way each of the panels is positioned on the back side of the vehicle seat thereby facilitating each of the panels to be visible to a user seated in a back seat in the vehicle. Each of the panels has indicia printed thereon and the indicia corresponding to curriculum taught in elementary and middle school to assist in teaching the curriculum to the user in the back seat.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new education device embodying the principles and concepts of an embodiment of the disclosure and generally designated by the reference numeral 10 will be described.

As best illustrated in FIGS. 1 through 6, the portable education assembly 10 generally comprises a pair of supports 12. Each of the supports 12 selectively engages a head rest 14 in a vehicle 16. The vehicle 16 may be a passenger vehicle or the like and the head rest 14 may be a head rest 14 on a front seat on the vehicle 16. Additionally, the vehicle 16 may have a back seat and a child may be seated on the back seat.

Each of the supports 12 comprises a fastener 18 that is manipulated to engage an associated one of a pair of posts on the head rest 14. The fastener 18 may be a snap ring, a mechanical clip and any other type of releasable fastener. Each of the supports 12 additionally includes a strip 20 and a member 22. The strip 20 is coupled to the fastener 18 and the strip 20 has a distal end 24 with respect to the fastener 18. The member 22 has a first end 26, a second end 28 and a first surface 30 extending therebetween. The first end 26 of the member 22 is coupled to the distal end 24 of the strip 20 such that the member 22 extends downwardly along a back side of a vehicle 16 seat.

Each of the supports 12 includes a plurality of first mating members 32 and each of the first mating members 32 is coupled to the first surface 30 of the member 22 corresponding to an associated one of the supports 12. The first mating members 32 are spaced apart from each other and are distributed between the first end 26 and the second end 28 of the associated support 12. Each of the first mating members 32 may comprise a hook and loop fastener or the like.

A plurality of panels 34 is provided and each of the panels 34 is removably coupled to the support 12. In this way each of the panels 34 is positioned on the back side of the vehicle 16 seat. Thus, each of the panels 34 is visible to the child that is seated in the back seat. Each of the panels 34 has indicia 36 printed thereon and the indicia 36 comprise elementary educational curriculum. The curriculum may include, but not be limited to, mathematics, spelling, geography and any other subject commonly taught in elementary school and middle school. The child views the indicia 36 when the child is seated in the back seat to assist in teaching the child. Each of the panels 34 has a primary end 38, a secondary end 40, a primary surface 42 and a secondary surface 44. Moreover, the indicia 36 are positioned in the primary surface 42.

A plurality of second mating members 54 is provided and each of the second mating members 54 is coupled to the secondary surface 44 of an associated one of the panels 34. Each of the second mating members 54 releasably engages an associated one of the first mating members 32. In this way each of the panels 34 is removably retained on the supports 12. Each of the second mating members 54 may comprise a hook and loop fastener or the like.

Figure 1:
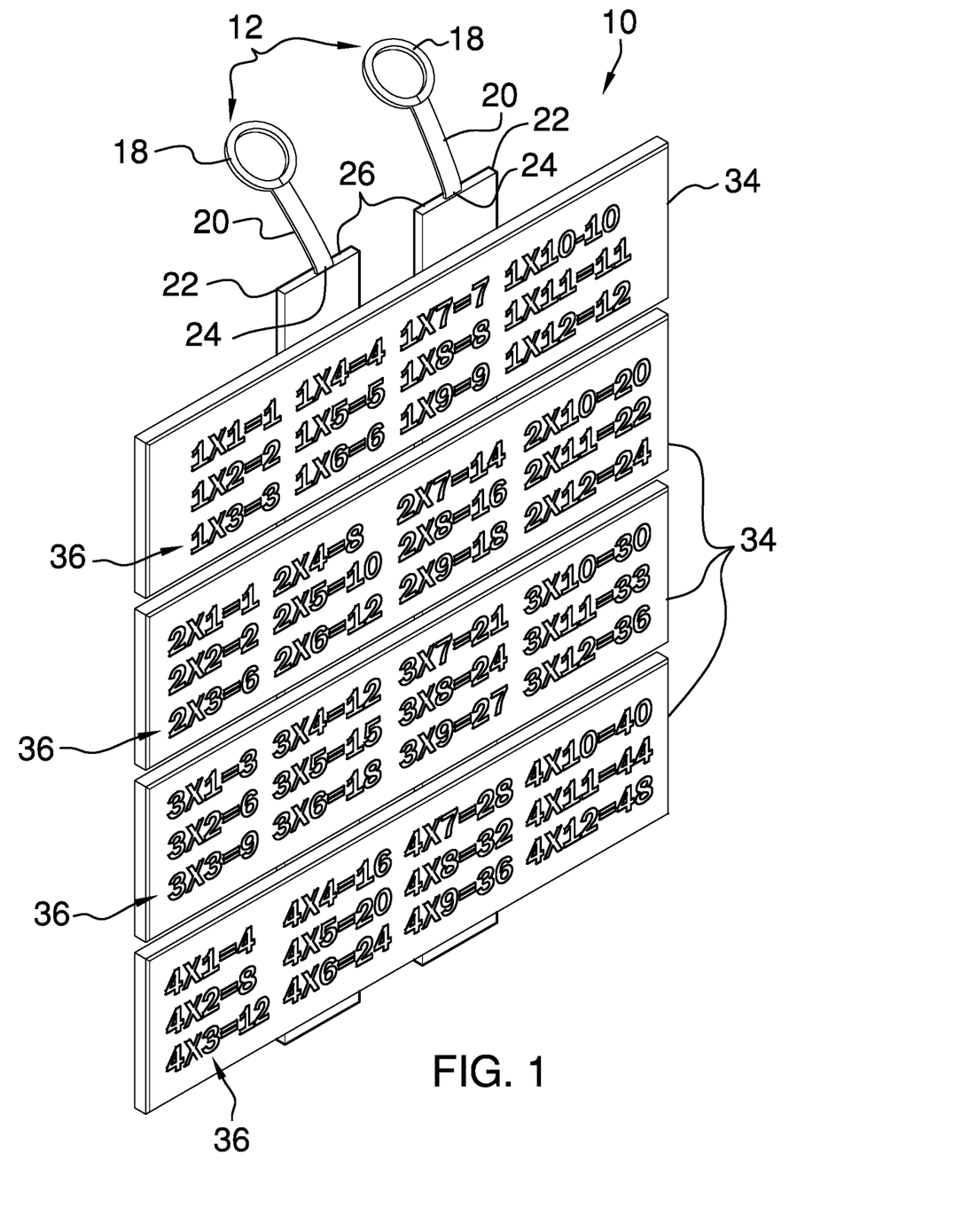
FIG. 1 is a perspective view of a portable education assembly according to an embodiment of the disclosure.
Figure 2:
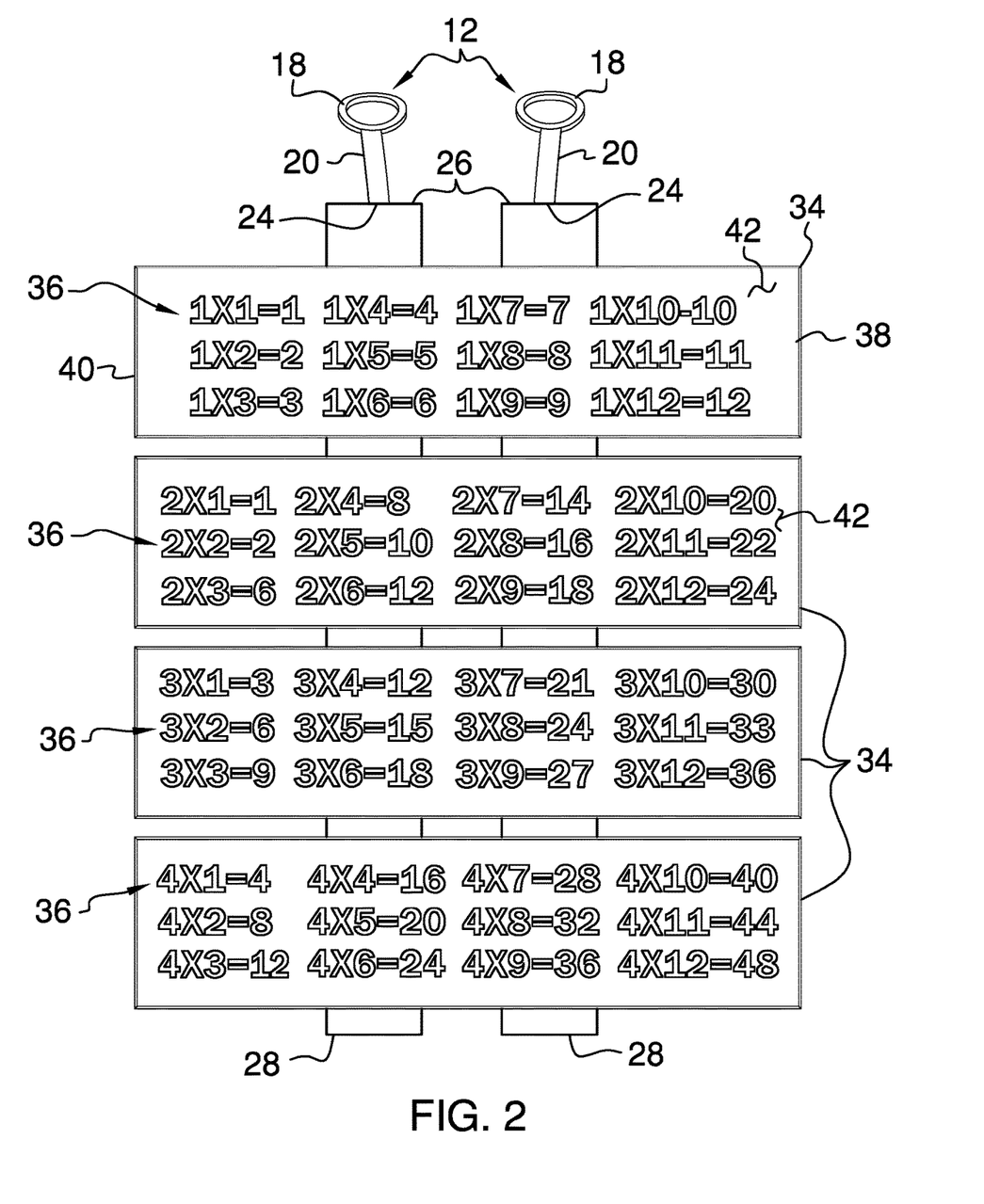
FIG. 2 is a front view of an embodiment of the disclosure.
Figure 3:
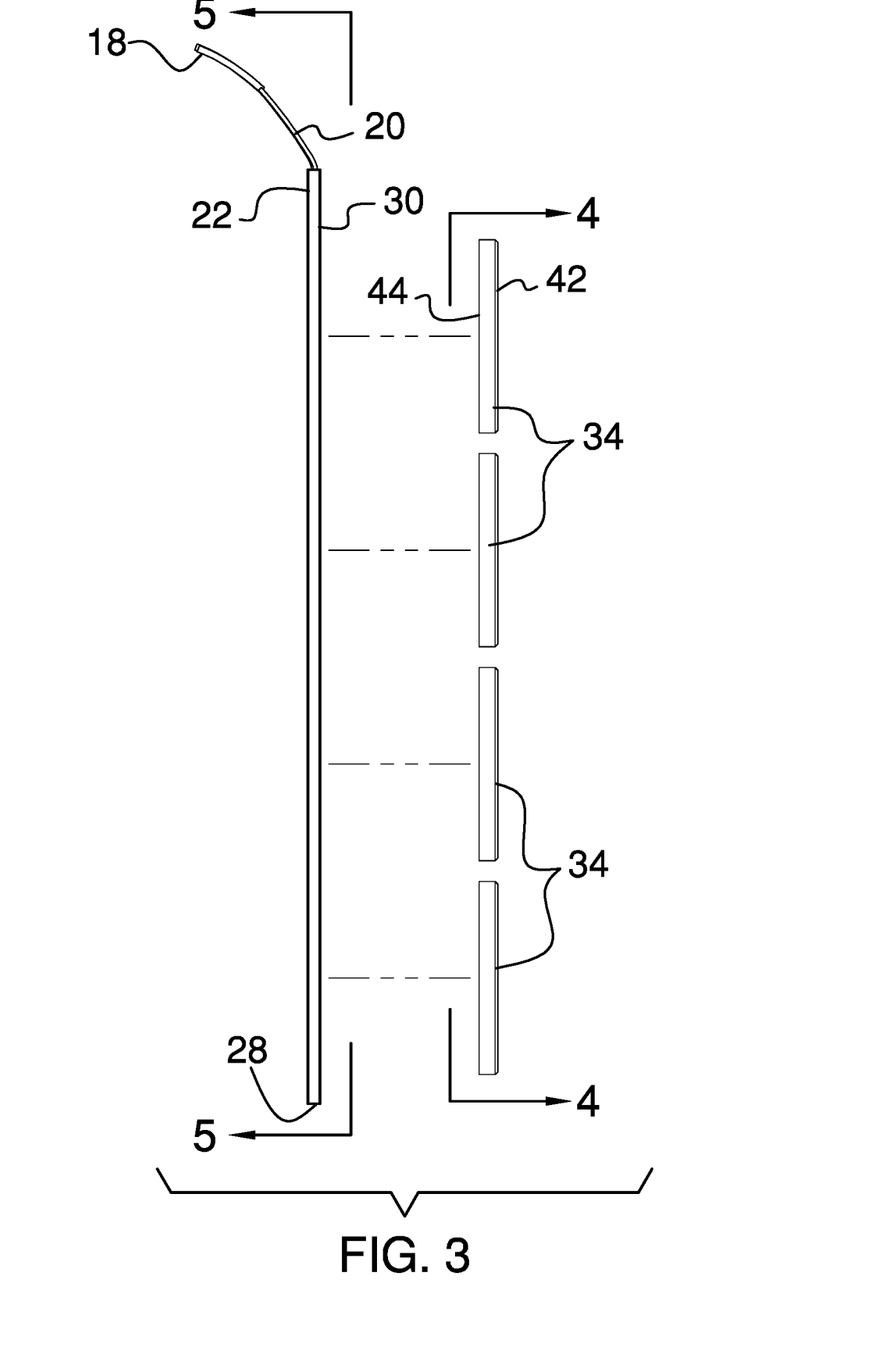
FIG. 3 is a right side exploded view of an embodiment of the disclosure.
Figure 4:
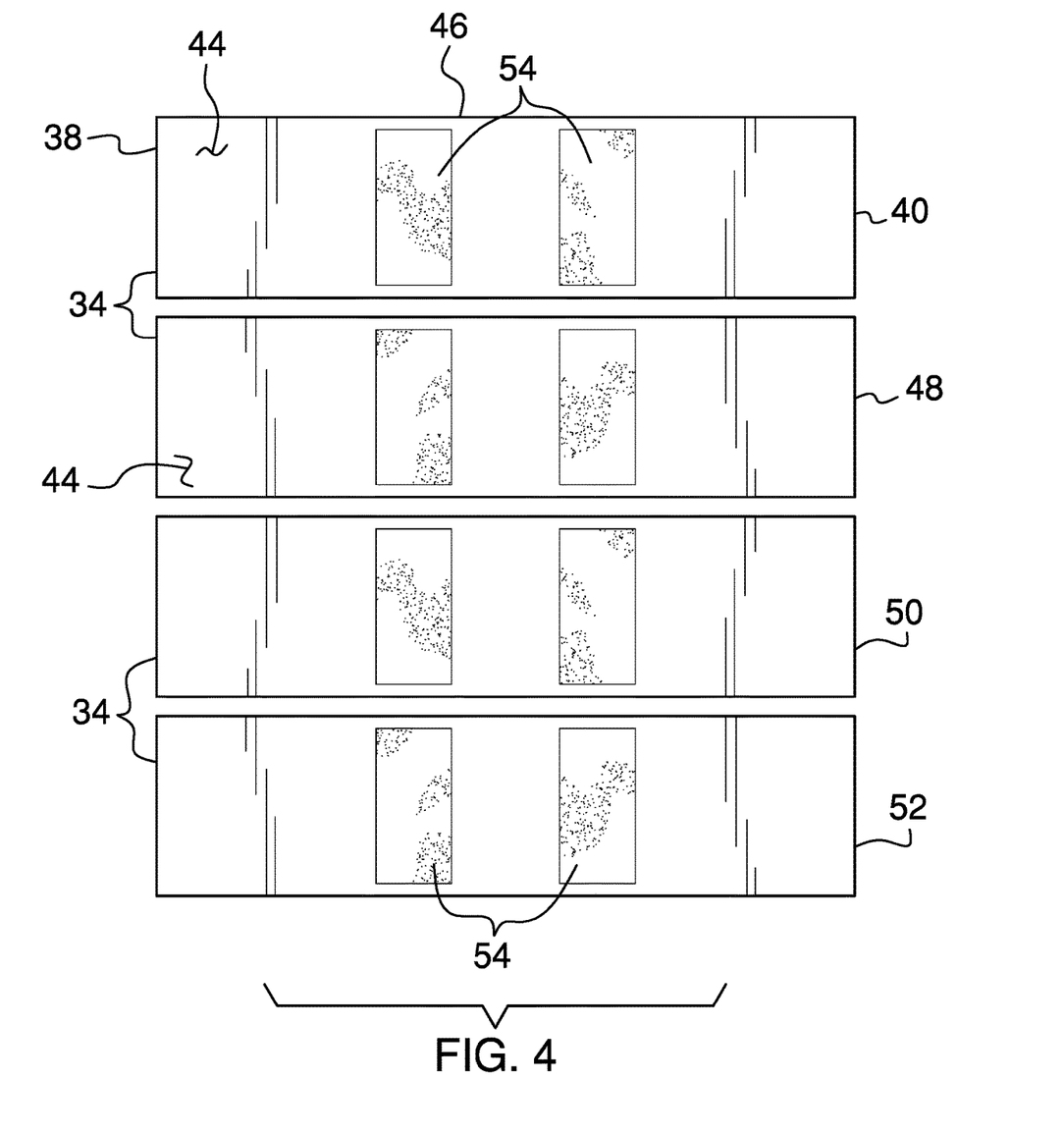
FIG. 4 is a back view of a plurality of panels of an embodiment of the disclosure.
Figure 5:
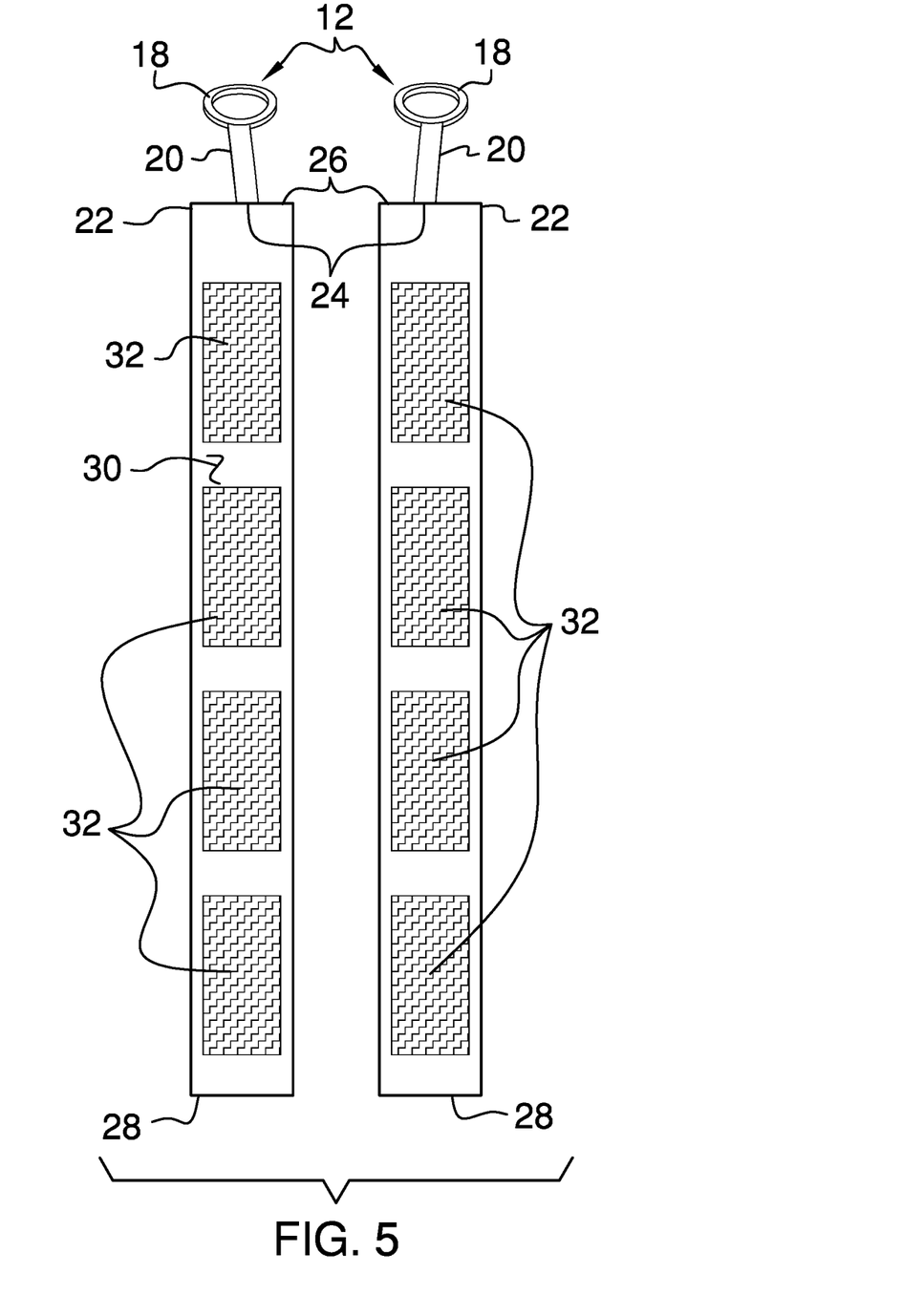
FIG. 5 is a front view of a pair of supports of an embodiment of the disclosure.
Figure 6:
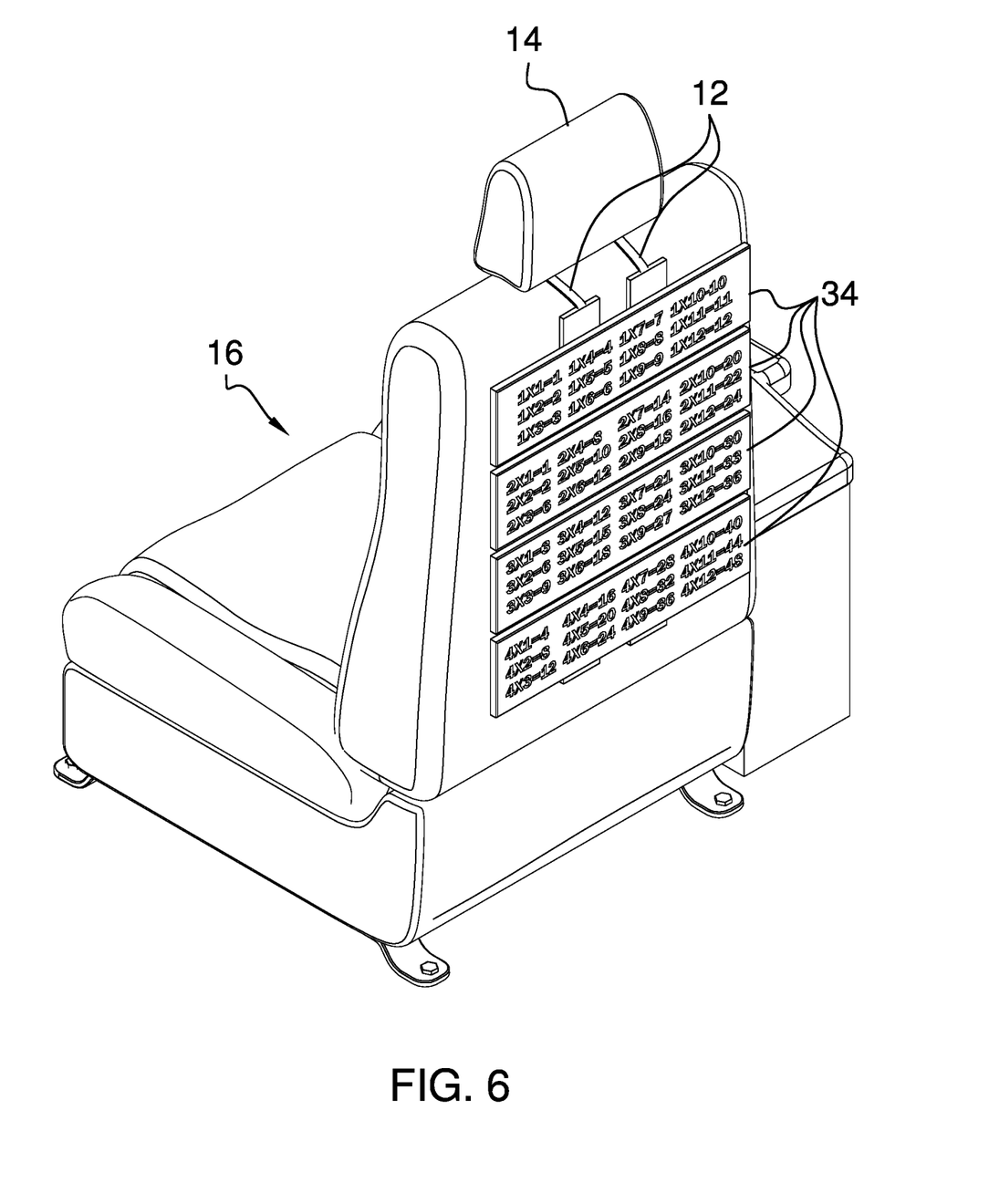
FIG. 6 is a perspective in-use view of an embodiment of the disclosure.

In use, the fastener 18 on each of the supports 12 is manipulated to engage the associated post on the head rest 14. The head rest 14 is coupled to the vehicle 16 seat thereby facilitating the pair of supports 12 to extend downwardly along the back side of the vehicle seat. Selected ones of the panels 34 are coupled to the supports 12 to facilitate the child seated in the back seat to view the indicia 36 on the selected panels 34. In this way the child may memorize and practice the curriculum associated with the indicia 36 while the child is seated in the back seat.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A portable education assembly being configured to be suspended from a vehicle seat thereby facilitating said assembly to be visible to a user, said assembly comprising:
   a pair of supports, each of said supports being configured to engage a head rest in a vehicle, each of said supports comprising
      a ring being configured to be positioned around an associated one of a pair of posts on the head rest,
      a strip being coupled to said ring, said strip having a distal end with respect to said ring,
      a member, said member being elongated and planar, said member having a first end, a second end and a first surface extending therebetween, said first end of said member being coupled to said distal end of said strip wherein said member is configured to extend vertically and downwardly along a back side of a vehicle seat, and
      a plurality of first mating members, each of said first mating members being planar and elongated, each of said first mating members being coupled to said first surface of said member corresponding to an associated one of said supports, said mating members being spaced apart from each other and being distributed between said first end and said second end of said associated support, each first mating member having a longitudinal axis perpendicular to a longitudinal axis of said member;
   a plurality of panels, each of said panels being elongated, each of said panels being removably coupled to said pair of supports wherein each of said panels is configured to be positioned on the back side of the vehicle seat with a longitudinal axis of said panel being horizontal thereby facilitating said panels to be visible to a user in a back seat in the vehicle, each of said panels having indicia being printed thereon, said indicia comprising multiplication tables wherein each of said panels is configured to assist in teaching multiplication to the user in the back seat; and
   a plurality of second mating members, each of said second mating members being elongated, each second mating member being planar and positioned on an associated one of said panels, each of said second mating members having a longitudinal axis perpendicular to the longitudinal axis of said associated panel.

2. The assembly according to claim 1, wherein each of said panels has a primary end, a secondary end, a primary surface and a secondary surface, said indicia being positioned in said primary surface.

3. The assembly according to claim 2, further comprising each of said second mating members being coupled to said secondary surface of an associated one of said panels, each of said second mating members releasably engaging an associated one of said first mating members such that each of said panels is removably retained on said supports.

4. A portable education assembly being configured to be suspended from a vehicle seat thereby facilitating said assembly to be visible to a user, said assembly comprising:
   a pair of supports, each of said supports being configured to engage a head rest in a vehicle, each of said supports comprising:
      a ring being configured to be positioned around an associated one of a pair of posts on the head rest,
      a strip being coupled to said ring, said strip having a distal end with respect to said ring, and
      a member having a first end, a second end and a first surface extending therebetween, said first end of said member being coupled to said distal end of said strip wherein said member is configured to extend downwardly along a back side of a vehicle seat;
   a plurality of first mating members, each of said first mating members being coupled to said first surface of said member corresponding to an associated one of said supports, said first mating members being spaced apart from each other and being distributed between said first end and said second end of said associated support, each of said first mating members having a longitudinal axis oriented perpendicular to a longitudinal axis of said member of said corresponding one of said supports;
   a plurality of panels, each of said panels being removably coupled to said pair of supports wherein each of said panels is configured to be positioned on the back side of the vehicle seat thereby facilitating said panels to be visible to a user in a back seat of the vehicle, each of said panels having indicia being printed thereon, said indicia comprising multiplication tables wherein each of said panels is configured to assist in teaching multiplication to the user in the back seat, each of said panels having a primary end, a secondary end, a primary surface and a secondary surface, said indicia being positioned in said primary surface; and a plurality of second mating members, each of said second mating members being coupled to said secondary surface of an associated one of said panels, each of said second mating members releasably engaging an associated one of said first mating members such that each of said panels is removably retained on said supports, each of said second mating members being elongated and oriented perpendicular to said associated one of said panels.

\* \* \* \* \*